W. ROSS.
Try Square.
No. 81,011. Patented Aug. 11, 1868.
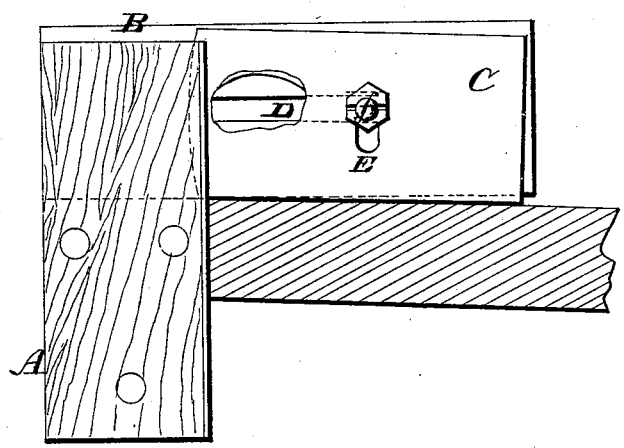
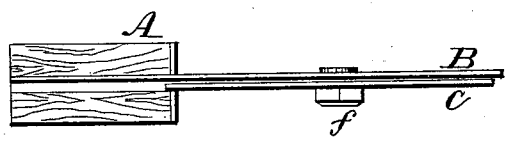

United States Patent Office.

WILLIAM ROSS, OF PADUCAH, KENTUCKY.

Letters Patent No. 81,011, dated August 11, 1868.

IMPROVEMENT IN TRY-SQUARES.

The Schedule referred to in these Letters Patent and making part of the same.

TO ALL WHOM IT MAY CONCERN:

Be it known that I, WILLIAM ROSS, of Paducah, in the county of McCracken, and State of Kentucky, have invented a new and useful Improvement in Try-Squares; and I do hereby declare that the following is a full, clear, and exact description thereof, which will enable those skilled in the art to make and use the same, reference being had to the accompanying drawings, forming part of this specification.

The object of this invention is to form a try-square, for squaring lumber and timber in house-joining, and for other purposes, in such a manner that the shape of the piece of timber, whether square or not, shall be indicated by the top of the blades of the square, and also so that the secondary blade may be used as a bevel; and the invention consists in attaching to the ordinary right-angled blade of a try-square a secondary blade, which blade is made to slide back and forth on the main blade, and hang loosely thereon, as will hereinafter be more fully described.

Figure 1 represents a side view of a try-square constructed according to my invention.

Figure 2 is an edge view of the same.

Similar letters of reference indicate corresponding parts.

A is the stock, and

B is the main or right-angled blade.

C is the secondary blade.

D is a longitudinal slot-hole in the main blade, and

E is a short transverse slot-hole in the blade C.

$f$ is a small screw-bolt, by which the two blades are attached together, but they are so attached that the blade C has free play, so as to adjust itself to the shape of the piece of timber to be worked where a right angle is desired.

In using the square for this purpose, the shape of the timber will be indicated by the position of the top edge of the secondary blade, as the lower edge adjusts itself to the timber, and if the timber is not square, the upper edges of the two blades will not be parallel.

This is readily seen and even felt in laying the square on the timber; consequently it is not necessary for the workman to stoop to look under the blade, as in the use of the ordinary try-square.

For dressing timber or lumber to a bevel, the blade C may be fixed or fastened on the main blade by turning the nut on the bolt $f$.

The slots D and E allow the blade C to slide or be slipped in either direction.

The slot in the stock A allows the blade C to slide entirely through the stock, in contact with the main blade.

The advantages of this arrangement are many and obvious, and the improvement must be appreciated by all who are familiar with the use of the ordinary try-square.

I am aware of the patent of N. Hamblin, granted October 29, 1867, but as his device is different from mine, I hereby disclaim his invention.

I claim as new, and desire to secure by Letters Patent—

The plate C, having the slot E, when held to the fixed blade by means of a clamping-screw, $f$, passing through the transverse slot E and the longitudinal slot D, whereby the plate C is made adjustable, both longitudinally and vertically, and is rendered equally useful in dressing lumber, either to a level or bevel, as herein shown and described for the purpose specified.

WILLIAM ROSS.

Witnesses:
GEO. MEYERS,
E. B. MEYERS.